US008050469B2

(12) United States Patent  (10) Patent No.: US 8,050,469 B2
Kaus et al.  (45) Date of Patent: Nov. 1, 2011

(54) AUTOMATED MEASUREMENT OF OBJECTS USING DEFORMABLE MODELS

(75) Inventors: Michael Kaus, Hamburg (DE); Jürgen Weese, Aachen (DE); Steven Lobregt, Waalre (DE)

(73) Assignee: Koninklijke Philips Electronics, N.V. Eindhoven (NL)

( * ) Notice: Subject to any disclaimer, the term of this patent is extended or adjusted under 35 U.S.C. 154(b) by 763 days.

(21) Appl. No.: 10/521,254

(22) PCT Filed: Jul. 11, 2003

(86) PCT No.: PCT/IB03/03117
§ 371 (c)(1),
(2), (4) Date: Sep. 14, 2005

(87) PCT Pub. No.: WO2004/010382
PCT Pub. Date: Jan. 29, 2004

(65) Prior Publication Data
US 2006/0165268 A1    Jul. 27, 2006

(30) Foreign Application Priority Data

Jul. 19, 2002 (EP) .................................... 02016061

(51) Int. Cl.
*G06K 9/00* (2006.01)
(52) U.S. Cl. ...................................... 382/128; 128/922
(58) Field of Classification Search .................. 382/128; 128/922
See application file for complete search history.

(56) References Cited

U.S. PATENT DOCUMENTS

| 5,673,298 | A * | 9/1997 | Mazess ........................... 378/54 |
| 5,926,568 | A * | 7/1999 | Chaney et al. ................. 382/217 |
| 6,396,492 | B1 * | 5/2002 | Frisken et al. ................. 345/420 |
| 6,560,476 | B1 * | 5/2003 | Pelletier et al. ............... 600/410 |
| 2002/0136440 | A1 * | 9/2002 | Yim et al. ..................... 382/131 |
| 2005/0018885 | A1 * | 1/2005 | Chen et al. .................... 382/128 |

FOREIGN PATENT DOCUMENTS
WO    WO9641567 A1    12/1996

OTHER PUBLICATIONS

Wu, Kenong, "Computing parametric geon descriptions of 3d multi-part objects", 1996, McGill University.*
Holten-Lund et al., "VRML Visualization in a Surgery Planning and Diagnostics Application", 2000, ACM.*
Weese et al., "Shape Constrained Deformable Models for 3D Medical Image Segmentation", 2001, Springer-Verlag, 380-387.*
Lorenz et al., "Generation of Point-Based 3D Statistical Shape Models for Anatomical Objects", 2000, Computer Vision and Image Understanding, 175-191.* William E. Lorensen, et al: Marching Cubes: A High Resolution 3D Surface Construction Algorithm, vol. 21, No. 4.pp. 163-167, Jul. 1987, IBM New York.
T. F. Cootes, et al: Active Shape Models—Smart Snakes, Vision Conf. pp. 266-275, 1992.
David Eberly: Least Squares Fitting of Data, Technical Report, NC, USA, 2001.
Hugues Hoppe, et al: Surface Reconstruction from Unorganized Points, Computer Graphics, vol. 26. No. 2 Jul. SIGGRAPH 1992 .
Tim McInerney et al, "Deformable Models in Medical Image Analysis: A Survey", Medical Image Analysis, 1(2):91-108, 1996, pp. 1-26.

* cited by examiner

*Primary Examiner* — Bhavesh Mehta
*Assistant Examiner* — Katrina Fujita

(57) ABSTRACT

The present invention relates to the field of digital imaging, in particular to the field of estimating geometrical properties of an anatomical object. According to the present invention, geometrical properties are automatically measured and geometrical properties which have a definition based on sub-parts of the object are derived. To do this, additional geometrical information is integrated into a surface model. Geometrical properties are included into the surface model by identifying and labelling sub-parts of the surface model and fitting geometric primitives to these sub-parts. This advantageously allows to identify these sub-parts on an unseen object surface and to automatically extract relevant geometric properties.

19 Claims, 6 Drawing Sheets

AUTOMATED MEASUREMENT OF OBJECTS USING DEFORMABLE MODELS

CROSS-REFERENCE TO RELATED APPLICATIONS

This application claims the benefits of priority from the prior PCT application No. PCT/IB03/03117 filed on Jun. 11, 2003, and European Patent No. EP020160610, filed Jul. 19, 2002, the entire contents of which are incorporated herein by reference.

The present invention relates to a method for determining geometrical properties of a structure of an object displayed in an image. Furthermore, the present invention relates to a method for determining a deformable model for adaptation to an object, to an image processing device and to a computer program for an image processing device for determining geometrical properties of an object.

The present invention relates in particular to the automated measurement of geometrical properties of anatomical objects using deformable models in the field of medical digital imaging. The increasing availability of 3D medical image data improves diagnostics and treatment possibilities dramatically. Due to the size and complexity of large 3D datasets, automated tools for quantitative measurements are important for fast, accurate and reproducible analysis of such image data in daily clinical routine. For example, applications include orthopaedic diagnosis and treatment (e.g. define and measure geometrical properties of bones in CT), or cardiac imaging (e.g. extract the location of specific axes required for scan-plane-planning in MR).

Manual definition and measurement of geometrical properties (e.g. the long axis of a femur shaft, the short axis of the left heart ventricle) based on image data is time consuming, subjective, and error prone, and therefore not clinically practical. A first step towards the automatic measurement is the extraction of the object surface, e.g. by adapting a deformable, parametric surface model to the object of interest. Methods of this kind are known, for example, from J. Weese et al. "Shape constrained deformable models for 3D medical image segmentation" 17$^{th}$ International Conference on Information Processing in Medical Imaging (IPMI), pages 380-387, Davis, Calif., USA, 2001, Springer Verlag, and T. McInerney et al. "Deformable models in medical image analysis: A survey" in Medical Image Analysis, 1(2):91-108, 1996. After initial placement of the deformable model by an operator with, for example, a mouse, the model is iteratively deformed until it matches the surface of the object to be measured. However, often the measurement of geometrical properties cannot readily be derived from the complete object surface. For example, the axis of a femur shaft or an angle between two vertebral endplates are geometrical properties defined by parts of the object, which are difficult to specify by a human operator in an accurate and reproducible fashion. Such methods are very well adapted to extract the surface of the object, providing all necessary information concerning the surface of the object. However, there are a great number of measurements of geometrical properties which cannot be derived from the object surface. For example, a center of a femur head or an axis of a femur shaft of the femur are geometrical properties which cannot be directly derived from the complete object surface.

It is an object of the present invention to provide a method for determining geometrical properties of a structure of an object displayed in an image, allowing automated measurements of geometrical properties of objects.

In accordance with the present invention, this object is solved with a method for determining geometrical properties of a structure of an object displayed in an image comprising the steps of adapting a deformable surface model to the object, applying additional geometrical information to the adapted deformable surface model of the object, and extracting the geometrical properties of the structure of the object from the adapted deformable surface model to which additional geometrical information has been applied.

According to the present invention, due to the integration of additional geometrical information into the deformable surface model, geometrical properties of the objects can advantageously automatically be measured. Furthermore, the present invention allows to derive geometrical properties from a surface of an object which have a definition based on sub-parts of the object. For example, the present invention allows to automatically extract a center of the femur head, whereas, only the surface of the whole femur is displayed. Due to the integration of additional geometrical information, diagnosis and treatment of a patient can be carried out more precisely.

An exemplary embodiment of the method, wherein surface elements belonging to a particular sub-part of the object are identified. Due to the identification of surface elements of sub-parts of the object, particular subparts of the object may be recognized automatically. For example, by identifying surface elements in the model belonging to the femur head, a femur head in an unseen image can be automatically identified and the boundaries of the femur head can be identified.

According to another exemplary embodiment, geometrical properties of the object are derived on the basis of the geometrical primitive. Advantageously, this allows a very simple procedure to identify geometrical properties of the object which are not based on the surface of the object. For example, the center of the femur head is identified from coordinates and parameters of the sphere fit to the femur head. Advantageously, a computation time is minimized.

Another exemplary embodiment of the present invention describes a preferred way to identify surface elements of the deformable model belonging to a particular sub-part of the object.

Another exemplary embodiment of the present invention, relates to a method for determining a deformable model for adaptation to an object, allowing the determination of a model which enables the automated measurement of geometric properties of objects when applied to an object. Furthermore, this method is a simple method for determining a deformable model which enables a highly accurate adaptation of the model to the object.

Advantageously, according to another exemplary embodiment of the present invention, surface elements belonging to sub-parts of the object are selected and labeled. This allows a simple and efficient reconnaissance of sub-parts of the object and an identification of surface elements belonging to these sub-parts requiring a minimized number of calculations when the model is applied to a new object in an image.

According to yet another exemplary embodiment of the present invention, a simple method is provided allowing an efficient determination of a transformation rule for fitting the geometric primitive into the surface model.

Another exemplary embodiment of an image processing device for executing the method according to an embodiment of the present invention and a computer program for such an image processing device is described.

As apparent from the above explanations and the following description, it is the gist of the present invention to integrate additional geometrical information into a deformable model, which model is then applied to an object displayed in an image, wherein, for determining geometrical properties of the structure of the object, the additional geometrical information is used. The geometrical properties may be included into the model by identifying and labelling sub-parts (e.g. surface elements of a mesh such as triangles) of the surface model and fitting geometric primitives (e.g. a sphere to the femur head) to these sub-parts in order to represent the geometrical properties. Since the number of surface elements (here the number of triangle) of a sub-part remains constant during adaptation of the surface model to the object, and the triangles reach the same anatomical location for individual objects, the adaptation of a label deformable model to an unseen image advantageously allows to identify the sub-parts on the unseen object surface based on a one-to-one point correspondence between original and adapted mesh.

These and other aspects of the invention will be apparent from and elucidated with the reference to the exemplary embodiments described hereinafter. The following exemplary embodiments of the present invention will be described with reference to the Figures.

Figure 1:
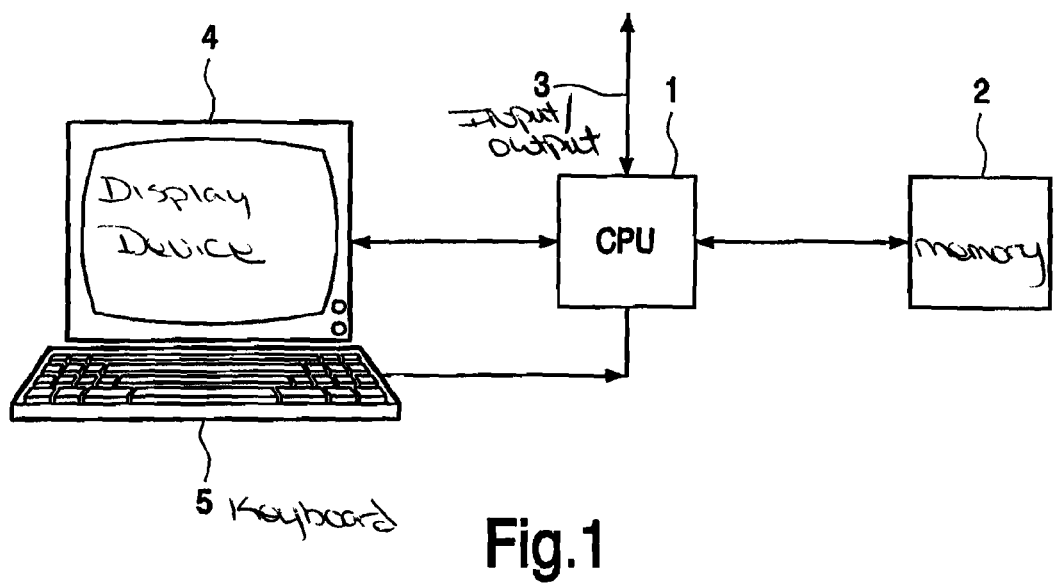
FIG. 1 shows a schematic representation of an exemplary embodiment of an image processing device suitable for executing an exemplary embodiment of the method according to the present invention.

FIG. 1 depicts an exemplary embodiment of an image processing device according to the present invention, for executing an exemplary embodiment of a method in accordance with the present invention. The image processing device depicted in FIG. 1 comprises a central processing unit (CPU) or image processor 1 connected to a memory 2 for storing a deformable model and an image depicting an object. The image processor 1 may be connected to a plurality of input/output-, network- or diagnosis-devices 3 such as an MR device or a CT device. The image processor is furthermore connected to a display device 4 (for, e.g. a computer monitor) for displaying information or images computed or adapted in the image processor 1. An operator may interact with the image processor 1 via a keyboard 5 and/or other output devices which are not depicted in FIG. 1.

Figure 2:
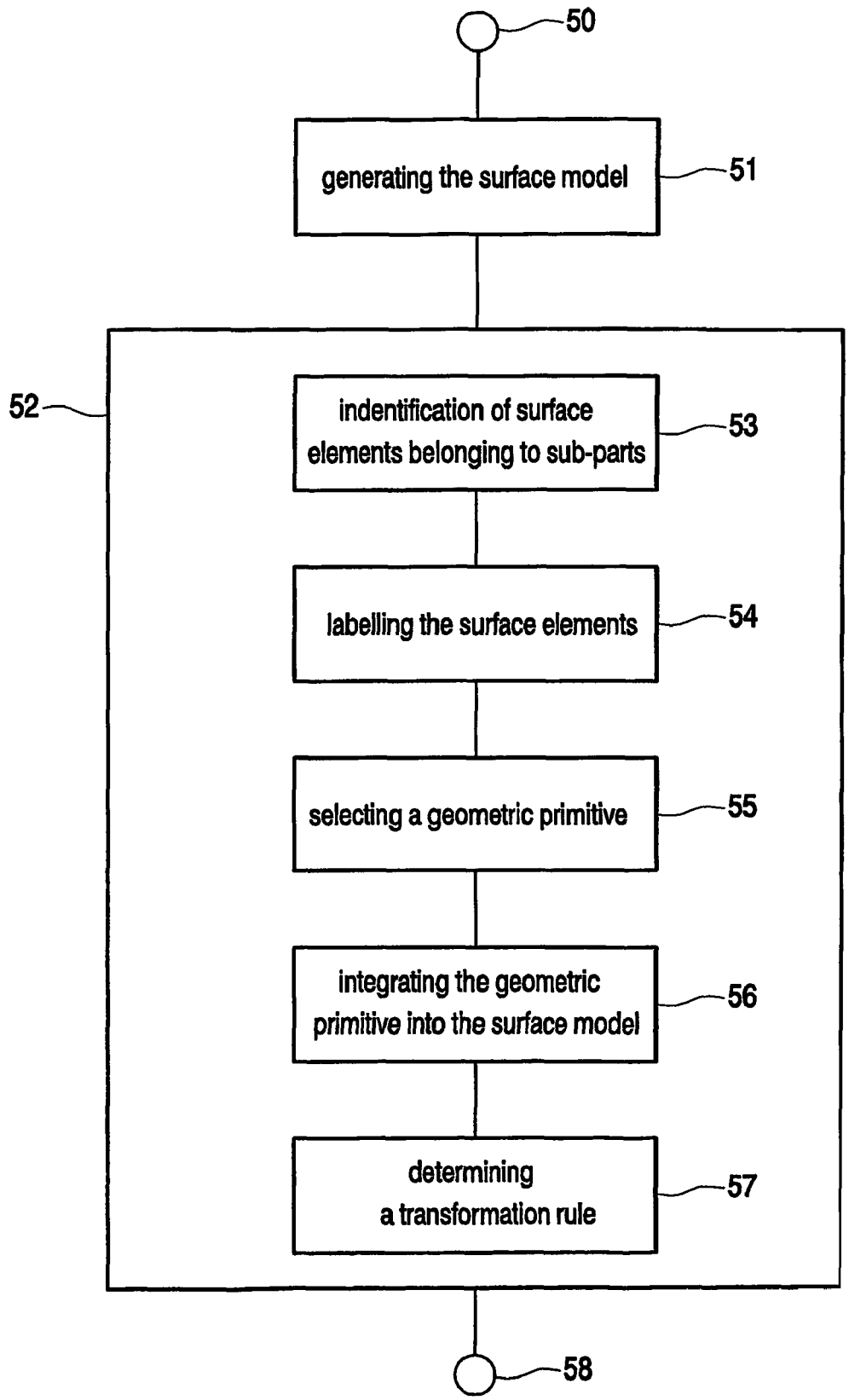
FIG. 2 shows a flow chart of an exemplary embodiment of a method for determining an extended deformable surface model according to the present invention.

FIG. 2 shows a flow chart of an exemplary embodiment of a method for determining an extended deformable model for adaptation to an object in accordance with the present invention. After an initialisation in step 50, in step 51, a surface model of the object wherein the surface model describes a surface of the object is generated. According to the present exemplary embodiment, the surface is represented by a polygonal mesh, where vertices $x_i$ are connected with edges. Here, a triangular mesh is used, but other representations such as simplex or general polygonal meshes are possible. The surface representation can be derived by a common triangulation method of a simple training object, for example as suggested by W. E. Lorensen et al. "Marching cubes: A high resolution 3d surface construction algorithm" Computer Graphics, 21(3): 163-169, 1987. Instead of a single surface triangulation, it is also possible to use a statistical shape model, such as suggested by T. F. Cootes "Active shape model—'smart snakes', in British Mach. and Vision Conf., pp. 266-275, 1992.

After generating the surface representation, i.e. the deformable surface model, additional geometric properties are integrated into the deformable surface model in step 52.

Step 52 comprises a step 53 wherein surface elements belonging to sub-parts of the object are identified. If the example of a femur is used, sub-parts of the femur are for example a femur head, a femur shaft etc. The sub-parts, i.e. the subdivision of the object into sub-parts, depends on which measurements are of interest. If, for example, a center of the femur head is of interest, preferably the femur is sub-divided into a femur head and a femur shaft. Then, in a following step 54, surface elements of the surface model, i.e. the triangles of the mesh, are labelled in accordance with the respective sub-part of the object to which they belong. As label, for example, integer numbers can be attached to the respective triangles. The triangles are labelled such that all triangles belonging to the same sub-part have the same label. This can for example be carried out by a physician with an interactive display and a pointing and selection device or with a corresponding selection method. However, it is also possible to use a pattern recognition algorithm for identifying and labelling sub-parts of the object for the geometric property to be measured.

Then, in step 55, a suitable geometric primitive is selected in accordance with the measurement to be carried out and a form of the respective sub-part. For example, when the center of the femur head is to be determined, a sphere is selected. Also, when the axis of the femur shaft is to be detected, a straight line is selected as geometrical primitive. This can be done by a physician or a suitable pattern recognition method.

Then, in step 56, the geometric primitive is fit into the surface model, i.e. the geometric primitive is fit to the surface elements of the respective sub-part of the object. The primitive can be fitted to the triangles of the mesh labelled as belonging to a particular sub-part, by for example minimizing orthogonal distances between the triangle coordinates and the primitive surface in the least-square sense. Examples for such fitting methods are described in D. Eberly, "Least squares fitting of points", Technical report, Chapel Hill, N.C., USA, 2001 and H. Hoppe et al., "Surface reconstruction from unorganized points" Computer Graphics (SIGGRAPH '92 Proceedings), 26(2)-71-78, 1992.

Then, in a step 57, a rule is determined for mapping the geometric primitives onto the sub-parts. In the present exemplary embodiment, the rule consists of the particular primitive for the particular sub-part and of the method for fitting the primitive to the sub-part.

Then, after the execution of step 52, which comprises steps 53-57, the method continues to step 58, where it ends with a finished extended deformable surface model. In distinction to known deformable surface models, this extended deformable surface model comprises additional geometrical information relating to, for example, which triangles of the surface mesh belong to a particular sub-part of the object of interest, which primitive fits to the form of this particular sub-part and which method is to be used for fitting this primitive to the particular sub part.

Figure 3:
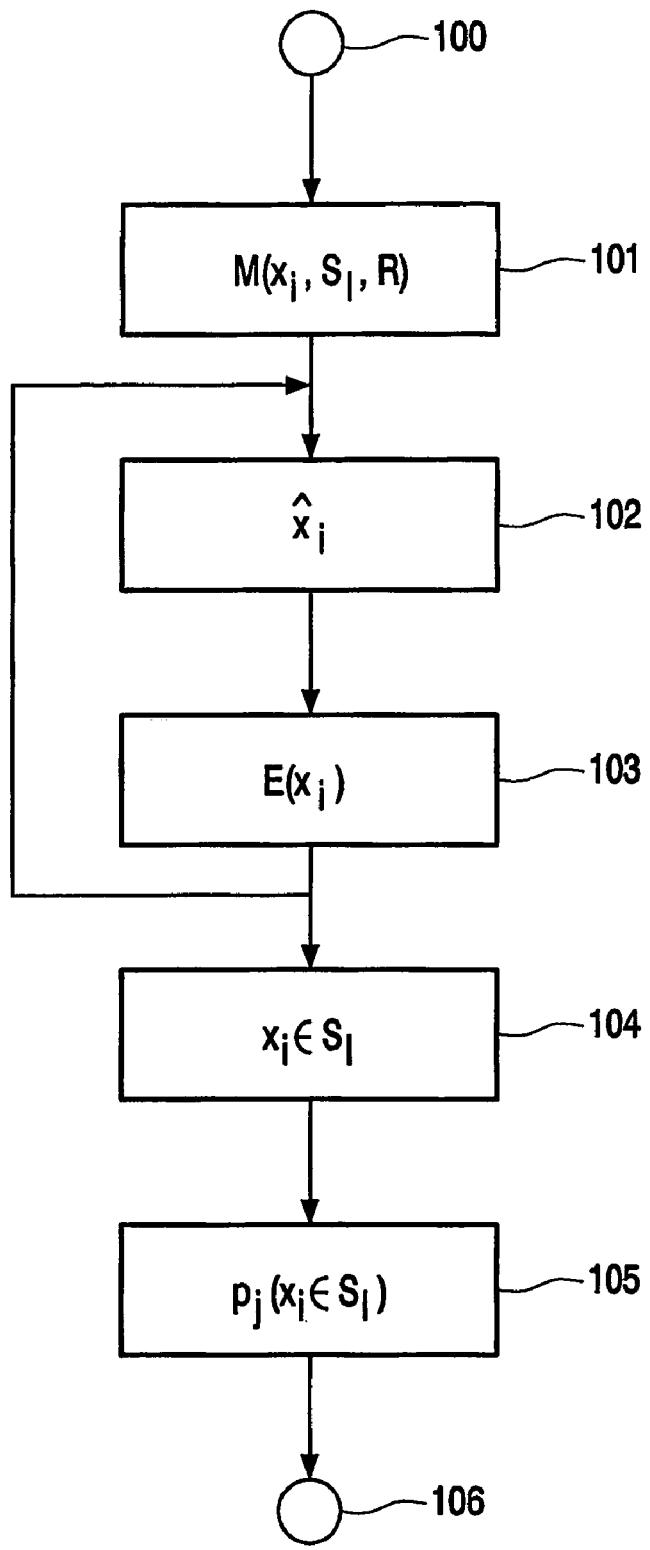
FIG. 3 shows a flow chart of an exemplary embodiment of the method according to the present invention.

In the following, with reference to the flow chart of FIG. 3, an exemplary embodiment of the method for determining geometrical properties of a structure of an object displayed in an image, in accordance with the present invention is described. After initialisation in step 100, in a step 101, an extended deformable model in accordance with the structure of the object in the image I containing the structure of interest is loaded. The extended deformable model M is described as $M(x_i, S_j, R)$ and may have been determined in accordance with the flow chart described with reference to FIG. 2.

In the following steps 102 and 103, an adaptation procedure is carried out that results in varying the positions of the deformable surface model, so that it optimally fits the surface of the object of interest in the image. Procedures for adapting the deformable surface model to the surface of the object are known for example from J. Weese et al. "Shape constrained deformable models for 3D medical image segmentation" 17th International Conference on Information Processing in Medical Imaging (IPMI), pages 380-387, Davis, Calif., USA, 2001, Springer Verlag or from T. McInerney et al. "Deformable models in medical image analysis: A survey" in Medical Image Analysis, 1(2):91-108, 1996.

The method of Weese et al. can be summarized as follows: In step 102, for each of the triangles, a search along the triangle normal is carried out to find a point $x_i$ that potentially lies on the boundary of the object in the image. From these surface points, an energy function is formulated. A minimization of the energy is carried out in step 103. The results are found vertex coordinates which reflect a tradeoff between being close to the boundary points and staying similar to the initial deformable model. From these new triangle coordinates, new boundary points are searched for in step 102, and so forth. Steps 102 and 103 are iterated a fixed number of times, leading to a deformed model close to the surface of the object of interest.

In the following steps 104 and 105, the actual measurement of the geometric properties of the object is carried out.

Figure 4:
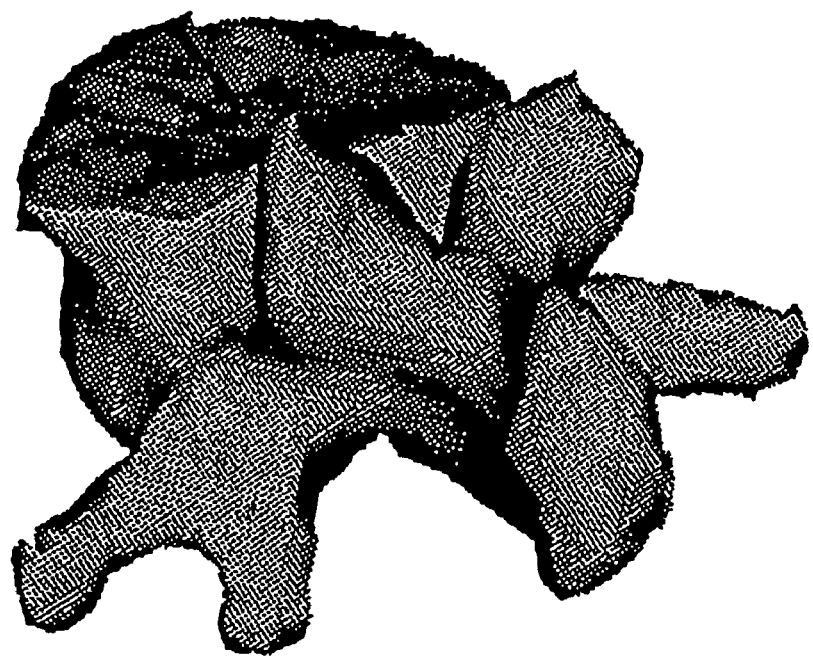
FIG. 4 shows an image of a vertebra model determined with a method according to an exemplary embodiment of the present invention applied to a vertebra.
Figure 5:
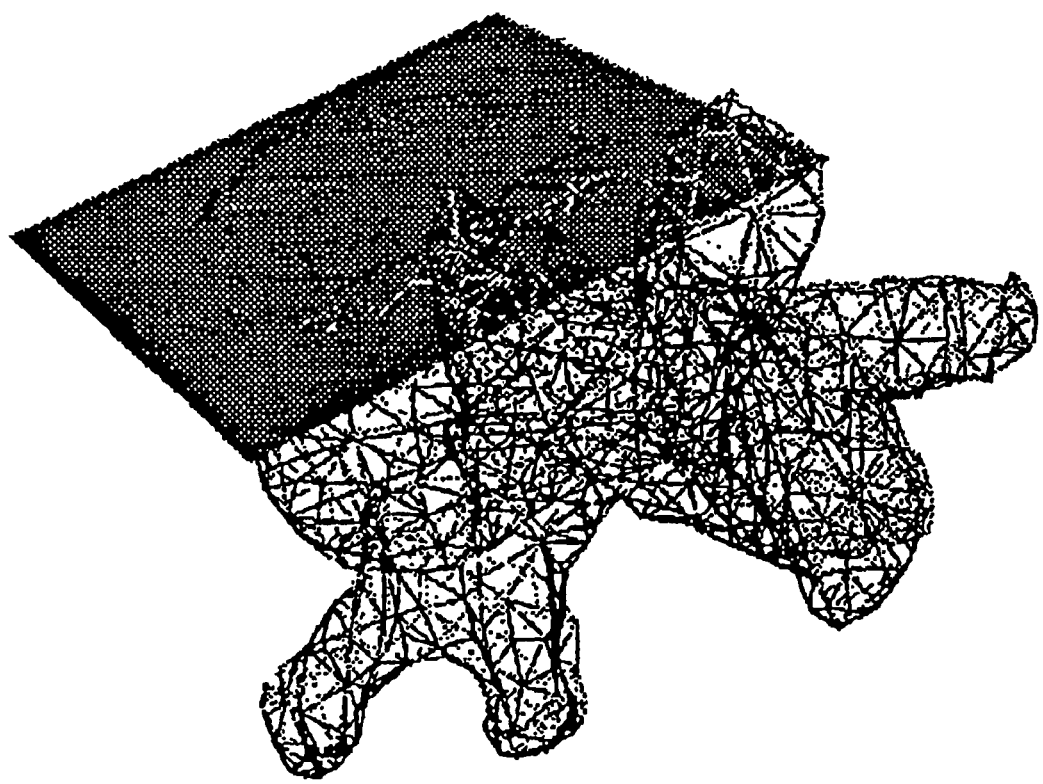
FIG. 5 shows an exemplary embodiment of an adaptation of a surface model according to an exemplary embodiment of the present invention to an image of a vertebra and the fitting of a plane to the top endplate of the vertebra in accordance with an exemplary embodiment of the present invention.

In step 104, a subset of vertices or triangles $x_i$ is extracted that defines the geometrical measurement to be carried out. This will be described with reference to the exemplary images shown in FIGS. 4 and 5. FIG. 4 shows a vertebra to which the extended deformable surface model has been applied and FIG. 5 is an image showing the surface mesh of the extended deformable surface model and the primitive, here a plane, fit to the top endplate of the vertebra. In the example shown in FIGS. 4 and 5, a position or orientation of the plane of the vertebra end plate is to be measured. Therefore, triangles that belong to top of the vertebra endplate are extracted, i.e. identified.

During adaptation of the deformable model to the object in steps 102 and 103, all triangles reach the same geometric location on the object, as on the training object. This means, a triangle that was located on the top endplate of the model before adaptation, will always be on the top endplate after adaptation to the new object. Also, the number of triangles that belong to the particular sub-part, here to the top endplate, remains constant during adaptation. These two facts together are called "one-to-one point correspondence" between original and adaptation.

Due to the one-to-one point correspondence, when applying the extended deformable surface model determined in accordance with the method described with reference to FIG. 2, the triangles belonging to a particular sub-part of the objects can be easily recognized. By this, an automatic reconnaissance of sub-parts of the object, such as the top endplate of a vertebra, is possible. In detail, in step 104, information relating to which triangles are part of the surface of which sub-part is applied as additional geometrical information to the surface model which has been adapted to the surface of the object in the image. This additional geometrical information is applied to the adapted deformable surface model by using the labels of the triangles which are part of the extended deformable surface model. As shown with the darker surface of the top endplate in FIG. 4, all triangles of the surface mesh adapted to the surface of the object which belong to the top endplate of the vertebra where identified. Then coordinates of these labelled triangles are determined.

This step 104 advantageously allows to automatically identify particular sub-parts of an object in a new image. This ability significantly facilitates the work of a physician. For example, in complex structures such as the brain, particular parts thereof can be recognized more easily and more accurately. This ability is also useful for the planning and rapid prototyping of prostheses, e.g. of femur prostheses.

Having extracted coordinates of the triangles of a particular sub-part, the method continues with step 105, where parameters representing geometric properties are estimated. In the examples of FIGS. 4 and 5, the parameters representing the geometric properties are a point $p_{11}$ and the normal $p_{12}$ of the plane fit to the top endplate of the vertebra. To do this, additional geometrical information, here the rule relating to a particular geometric primitive and a method for fitting the geometric primitives to the coordinates of the labelled triangles is applied to the deformable surface model which was adapted to the surface of the object in the image.

The rule for estimating these parameters, given the coordinates of the triangles is given by the extended deformable model loaded in step 101. As already indicated above, the rule consists of a particular geometric primitive (here a plane) and a method for fitting the geometric primitives to the coordinates of the labelled triangles.

Then, in step 105, the respective geometric primitive, here the plane, is fit to the coordinates of the labelled triangles belonging to the top end plate of the vertebra, by, for example, minimizing the orthogonal distances between the triangle coordinates and the surface of the geometrical primitive in the least-square sense.

After the orthogonal distances are minimized, coordinates of a point p.sub.11 and the normal p.sub.12 of the plane are known, which may be output as the geometric properties 106.

In brief, according to the method described with reference to FIG. 3, a deformable surface model as known in the art is adapted to the surface of the object of interest in the image. This means that positions of triangles of a surface mesh are altered until the triangles "lie" on the surface of the object. Then, additional geometrical information is applied to the adapted surface mesh: The triangles belonging to a particular sub-part of the object are identified, e.g. labelled with a respective integer number, and the geometrical primitive is fit to the labelled triangles. The geometrical primitive and the method for fitting the geometrical primitive to the labelled triangles are part of the extended deformable surface model loaded in step 101. On the basis of the coordinates of the fitted primitive and the properties of the primitive, the desired geometrical properties are determined.

Figure 6:
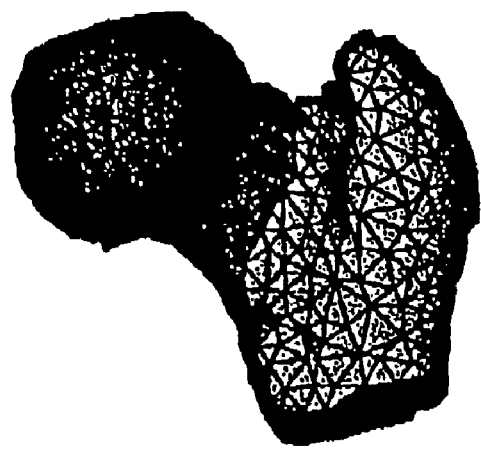
FIG. 6 shows an exemplary image of a femur head, wherein the surface elements belonging to a sub-part of the femur have been labelled, in accordance with an exemplary embodiment of the present invention.
Figure 7:
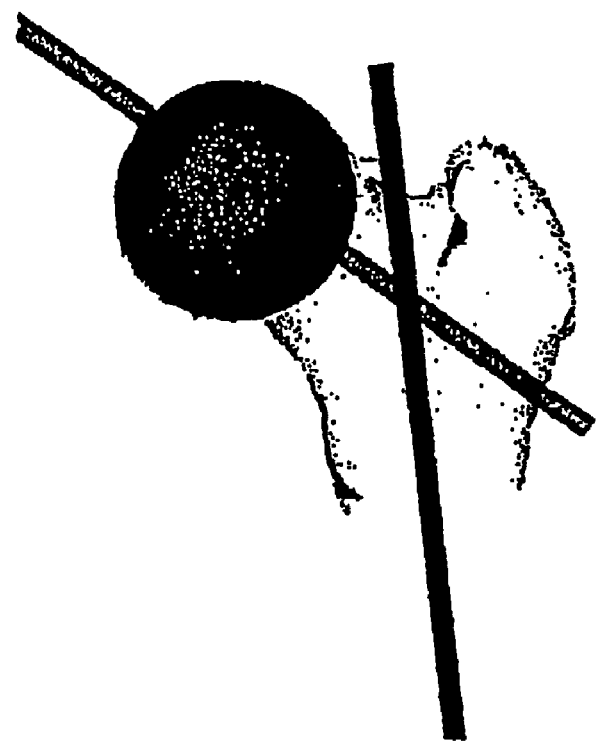
FIG. 7 shows an image of a femur wherein primitives were fit to sub-parts of the femur, in accordance with an exemplary embodiment of the present invention.
Figure 8:
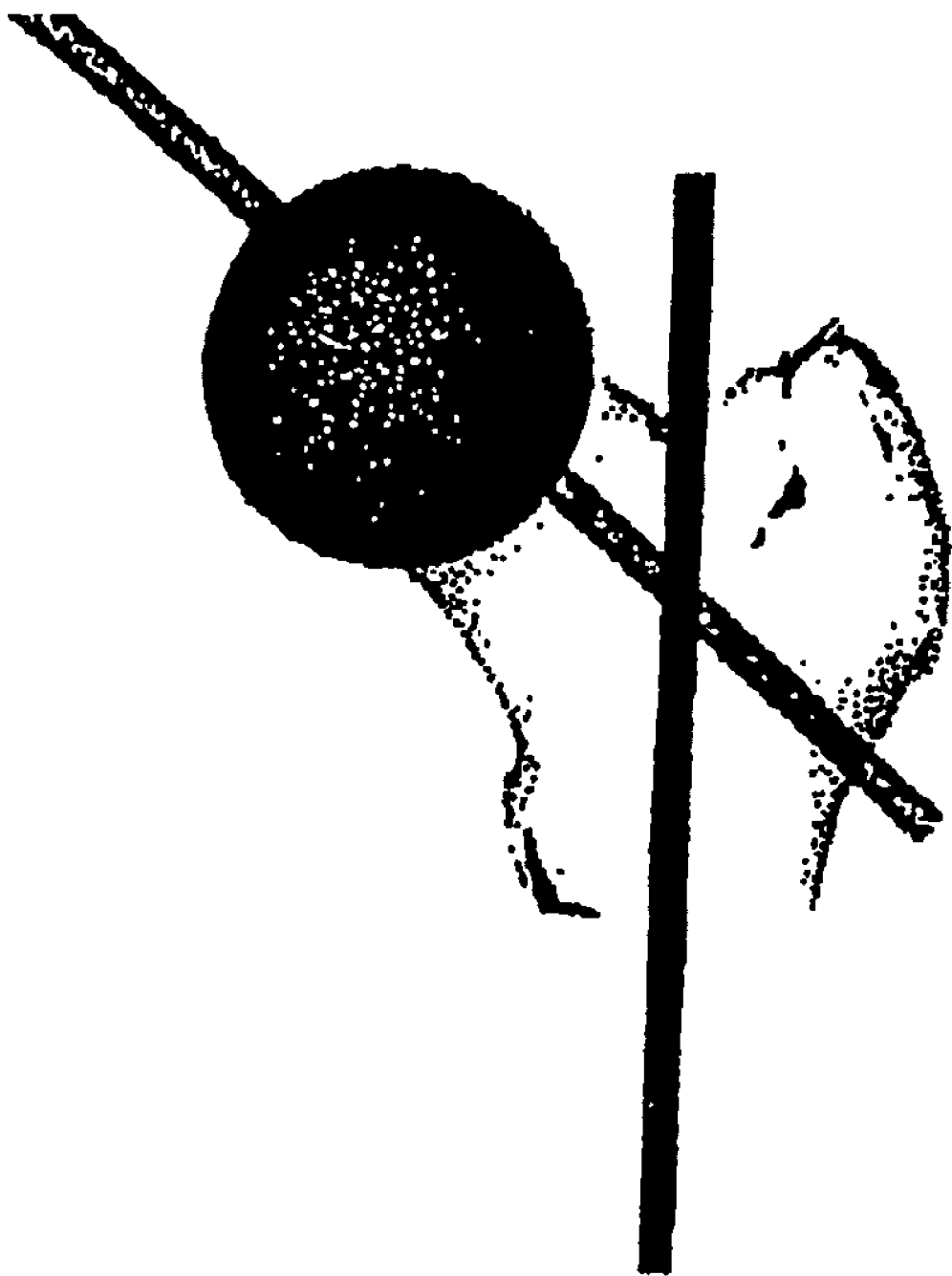
FIG. 8 shows an image wherein geometric properties of the femur are derived from the geometric primitive, in accordance with an exemplary embodiment of the present invention.

FIGS. 6, 7 and 8 show another example for automated geometric measurements in accordance with an exemplary embodiment of the present invention. In FIG. 6, an extended deformable model determined in accordance with the present invention was applied to an image of a femur. In the extended deformable model, the femur head was labelled, the femur neck was labelled and the beginning of the shaft was labelled. Thus, due to the one-to-one point correspondence between original and adapted mesh, the femur head is identified and all surface elements of the mesh belonging to the femur head are labelled with the same label and recognized automatically. Also, the femur neck and the femur shaft were automatically identified and all surface elements belonging to the femur neck and the femur shaft were labelled accordingly.

In FIG. 7, in accordance with the rule formulated in the deformable model, suitable primitives were fit to the respective surface elements labelled in accordance with the respective sub-part. Here, a sphere was fit to the surface elements of the femur head, a straight line was fit to the respective surface elements of the femur neck and another straight line was fit to the surface elements belonging to the femur shaft.

Then, here indicated with FIG. 8, automatically, a center of the femur head, a direction location of the axis of the femur neck and a location and orientation of the femur shaft can be derived directly from the two straight lines and the sphere by just using the parameter of these primitives.

Accordingly, the present invention enables the extraction of geometric properties of an object which are not directly defined by the surface of the object.

Exemplary embodiments of the above methods and device may advantageously be used for orthopaedic diagnosis and treatment (for example, to define and measure geometric properties of bones etc.) or cardiac imaging (for example, exacting the location of specific axes required for scan-plane-planning in MR).

The invention claimed is:

1. A method for determining geometrical properties of a structure of an object of interest displayed in an image, comprising the steps of:
   (a) generating a deformable surface model of a surface of a training object, wherein the deformable surface model includes a mesh of triangles;
   (b) generating an extended deformable surface model of the training object by associating additional geometrical information to the generated deformable surface model of the training object, wherein the step of generating an extended deformable surface model includes:
      identifying triangles belonging to sub-parts of the training object;
      labeling the triangles belonging to the respective sub-parts of the training object;
      selecting a geometric primitive in accordance with a measurement to be carried out and a form of a selected corresponding sub-part;
      fitting the geometric primitive to surface elements labeled to the selected corresponding sub-part;
      determining a rule which defines the selected geometric primitive and a method which fits the selected primitive onto the selected corresponding sub-part; and
      labeling each triangle with the determined rule along with the respective sub-part label to generate an extended deformable surface model;
   (c) adapting the extended deformable surface model to a surface of the object of interest, such that a one-to-one point correspondence is maintained between the extended deformable surface model and the adapted extended deformable surface model;
   (d) determining the geometrical properties of the structure of the object of interest from the adapted extended deformable surface model according to the associated additional geometrical information; and
   (e) extracting at least one measurement of interest of the structure based on the determined geometrical properties.

2. The method according to claim 1, wherein step (b) of generating an extended deformable surface model further comprises the steps of:
   identifying surface elements of the deformable surface model relating to a particular sub-part of the training object;
   selecting a geometrical primitive having a form corresponding to a form of the particular sub-part; and
   fitting the geometrical primitive to the surface elements relating to the particular sub-part of the training object in the deformable surface model.

3. The method according to claim 2, wherein the additional geometrical information is associated with each surface element of the extended deformable surface model.

4. The method according to claim 3, wherein the additional geometrical information includes a sub-part identification, the selected geometric primitive, and a method for fitting the geometric primitive.

5. The method according to claim 2, wherein the one-to-one correspondence ensures that the position of a surface element and the number of surface elements are maintained after adaptation.

6. The method according to claim 1, wherein each triangle having a normal and the step (c) of adapting the extended deformable surface model includes:
   for each triangle, searching along a triangle normal to find a point of intersection with the surface of the object of interest;
   formulating an energy function between the points of intersection and vertices of the triangular mesh;
   minimizing the energy function to define new coordinates for the vertices of the triangular mesh; and
   iteratively repeating the steps of searching along a triangle normal, formulating an energy function, and minimizing the energy function to generate the adapted extended deformable surface model.

7. The method according to claim 6, wherein the object is a femur and the subparts include a femur head and a femur shaft.

8. The method according to claim 7, wherein the geometric primitive fit to the femur head includes a sphere and the geometric primitive fit to the femur shaft includes a straight line.

9. The method according to claim 6, wherein the structure of the object of interest corresponds to the selected corresponding sub-part and the step (d) of determining geometrical properties of the structure of the object of interest includes:
   extracting the vertex coordinates of the triangular mesh of the selected corresponding sub-part;
   fitting the geometric primitive to the extracted coordinates according to the rule labeled to the respective triangles; and
   estimating parameters which define at least one geometrical property of the fitted geometric primitive.

10. The method according to claim 1, wherein the training object and the object of interest are distinct.

11. An image processing device, comprising:
   a processor programmed to perform the method of claim 1; and
   a memory which stores the deformable surface model of the training object and an image depicting the object of interest.

12. An image processing device, comprising:
a memory which stores a simple training model and an image depicting an end sub-part and a shaft sub-part of a bone; and
an image processor which determines geometrical properties of the of the sub-parts of the bone, wherein the processor is programmed to perform the following operations:
(a) generating a deformable surface model of a surface of a training object, the training object being distinct from the bone depiction;
(b) generating an extended deformable surface model of the training object by associating additional geometrical information to the generated deformable surface model of the training object;
(c) adapting the extended deformable surface model to a surface of the bone, such that a one-to-one point correspondence is maintained between the extended deformable surface model of the training model and the adapted extended deformable surface model of the bone;
(d) determining the geometrical properties of the sub-parts of the bone from the adapted extended deformable surface model based on the associated additional geometrical information; and
(e) extracting at least one measurement of interest of the sub-parts based on the determined geometrical properties.

13. The image processing device according to claim 12, wherein the bone is a femur, the end sub-part is a femur head, and the shaft sub-part is a femur shaft.

14. A non-transitory computer-readable medium having processor-executable instructions thereon for execution by a processor of an image processing device to control the processor to determine geometrical properties of a structure of an object of interest by performing:
a) generating a deformable surface model of a surface of a training object;
(b) generating an extended deformable surface model of the training object by associating additional geometrical information to the generated deformable surface model of the training object;
(c) adapting the extended deformable surface model to a surface of the object of interest, such that a one-to-one point correspondence is maintained between the extended deformable surface model and the adapted extended deformable surface model;
(d) determining the geometrical properties of the structure of the object of interest from the adapted extended deformable surface model according to the associated additional geometrical information; and
(e) extracting at least one measurement of interest of the structure based on the determined geometrical properties.

15. A method for determining geometric properties of a subpart of an object of interest, comprising:
(a) with a processor, generating a deformable surface model represented by a polygon mesh of a surface of a training object;
(b) with the processor, extending the generated deformable surface model with additional geometrical information;
(c) with the processor, deforming the extended deformable surface model to optimally fit a surface of at least one sub-part of the object of interest;
(d) with the processor, determining geometrical properties of the object of interest based on the additional geometrical information of the deformed extended surface model fit to the sub-part.

16. The method according to claim 15, further including:
labeling elements of the polygon mesh corresponding to the at least one sub-part;
selecting a geometrical primitive having a form corresponding to a form of the particular sub-part; and
fitting the geometric primitive to the labeled elements of the polygon mesh corresponding to each of the at least one sub-part of interest.

17. The method according to claim 15, wherein the deformable surface model is generated of at least a first and a second sub-part of the training object and further including:
identifying elements of the polygon mesh fit to the first sub-part;
identifying elements of the polygon mesh fit to the second sub-part;
fitting a first geometric primitive to the elements of the polygon mesh identified to the first sub-part;
fitting a second geometric primitive to the elements of the polygon mesh identified to the second sub-part;
deforming the first and second primitives as part of the deformed extended surface model; and
determining the geometric properties of the object of interest using properties of the first and second deformed geometric primitives of the deformed extended surface model.

18. The method according to claim 17, wherein the object of interest is a bone, the first and second sub-parts are an end and a shaft, respectively, of the bone, the first and second geometric primitives are a sphere and a line, respectively, and the geometric property of the object of interest is at least one of a location, an orientation, and/or a center which are derived directly from parameters of the first and second deformed primitives.

19. The method according to claim 15, wherein the step of deforming the extended deformable surface model to optimally fit the surface of the at least one sub-part of the object of interest, further includes:
identifying a plurality of surface points of the surface of the sub-part of the object of interest; and
altering the polygon mesh to fit vertices of the polygons mesh to the identified surface points.

* * * * *